Patented May 28, 1935

2,002,822

UNITED STATES PATENT OFFICE 2,002,822

ARTIFICIAL PRODUCTS OF REGENERATED CELLULOSE

Herbert Mahn, Harry Meyer, and Hugo Pfannenstiel, Dessau in Anhalt, Germany, assignors to I. G. Farbenindustrie Aktiengesellschaft, Frankfort-on-the-Main, Germany No Drawing. Application January 13, 1930, Serial No. 420,599½. In Germany January 24, 1929

9 Claims. (Cl. 18—54)

Our present invention relates to a process of manufacturing artificial products of dull luster, and more particularly to such products made from a viscose solution.

According to our invention, dull artificial products, such as threads, fibers, horsehair, bands, films and so on consisting of regenerated cellulose and manufactured from a viscose solution by the action of an acid coagulating bath are obtainable by adding to the viscose solution at any stage of its manufacture a water-insoluble acid amide.

As such a compound producing a reduced luster in the finished article, we may emulsify in the viscose solution for instance methylacetanilide, ethylacetanilide, sym. diethyldiphenyl urea, asym. diphenyl urea, ethyl phenyl ethyl tolyl urea of the formula

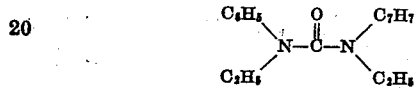

N-diethylbenzamide and methylbenzamide, N-isobutylbenzamide and similar compounds.

The quantity of the said acid amides, we add, may be varied in wide limits, but we prefer to use them in a quantity of about 0.15 per cent calculated on the quantity of viscose solution used and generally, a smaller or larger quantity than 0.15 per cent is to be added according to the desired degree of dullness. Good products are, however, obtainable even when adding up to 2 per cent. The agent to be added, especially if it is a solid body, may also be employed by dissolving it in an organic solvent. In this case, we prefer a water-insoluble solvent, such as for instance carbondisulfide. In order to ensure a good emulsification of the product or of solution thereof, a wetting or emulsifying agent may be used, such as alkylnaphthalene sulfonic acids, Turkey red oil, sodium salt of phenylacetic acid and so on. Obviously, we need not use the compounds mentioned above in a pure state; crude mixtures of acid amides, such as obtained in the course of manufacture, or mixtures with organic bases, such as for instance ethylaniline, quinoline and so on give a similar result. We may add such an organic acid amide at any suitable stage in the manufacture of the viscose solution. For example, it may be added to the carbondisulfide used to prepare the cellulose xanthogenate, or to the xanthogenate formed or mixed with the viscose solution before the coagulating operation. In order to accomplish the object of our invention, it is essential that a precipitating bath is used possessing a distinctly acid reaction. In this way, the organic acid amide incorporated into the viscose solution is converted into a water-soluble compound and dissolved out of the products obtained.

The following examples serve to illustrate the invention, the parts being by weight:—

Example 1.—100 parts of wood pulp containing from 9 to 10 per cent of moisture are placed in 2000 parts or 18 per cent caustic soda solution at 15° C. and allowed to steep for about 3 hours. Then the pulp is pressed until its total weight is about 300 parts, ground in a milling machine and kept for about 60 to 72 hours at room temperature, whereafter 30 to 60 parts of carbondisulfide are added. The mixture preferably while stirring or agitating in a sulfidizing drum is kept for several (for example 4 to 8) hours at room temperature. Thereafter, the excess of the carbondisulfide is removed and then the sulfidized mass is dissolved in dilute caustic soda solution in such a manner that the viscose contains about 6 per cent of cellulose and 5 per cent of alkali. While stirring intensively, 0.15 per cent of phenyl ethyl tolyl ethyl urea are added, so that a fine emulsion is formed. This viscose solution is spun in the usual manner into an acid precipitating bath containing for instance 13.5 per cent of sulfuric acid and 30 per cent of sodium sulfate. The artificial silk thus obtained is finished as known in the art and shows in the dry state a reduced luster, but without reduction of wet and dry tenacity.

Example 2.—To the carbondisulfide used in sulfidizing the alkali cellulose as obtained according to the conditions given in Example 1, 4 parts of ethylacetanilide are added. The xanthogenate obtained is dissolved in a dilute caustic soda solution in such a manner that the viscose contains about 7.5 per cent of cellulose. From the viscose solution obtained which contains 0.33 per cent of ethylacetanilide, threads are spun in a coagulating bath containing sulfuric acid and sodium sulfate. The finished threads show a similar appearance as those obtainable according to Example 1.

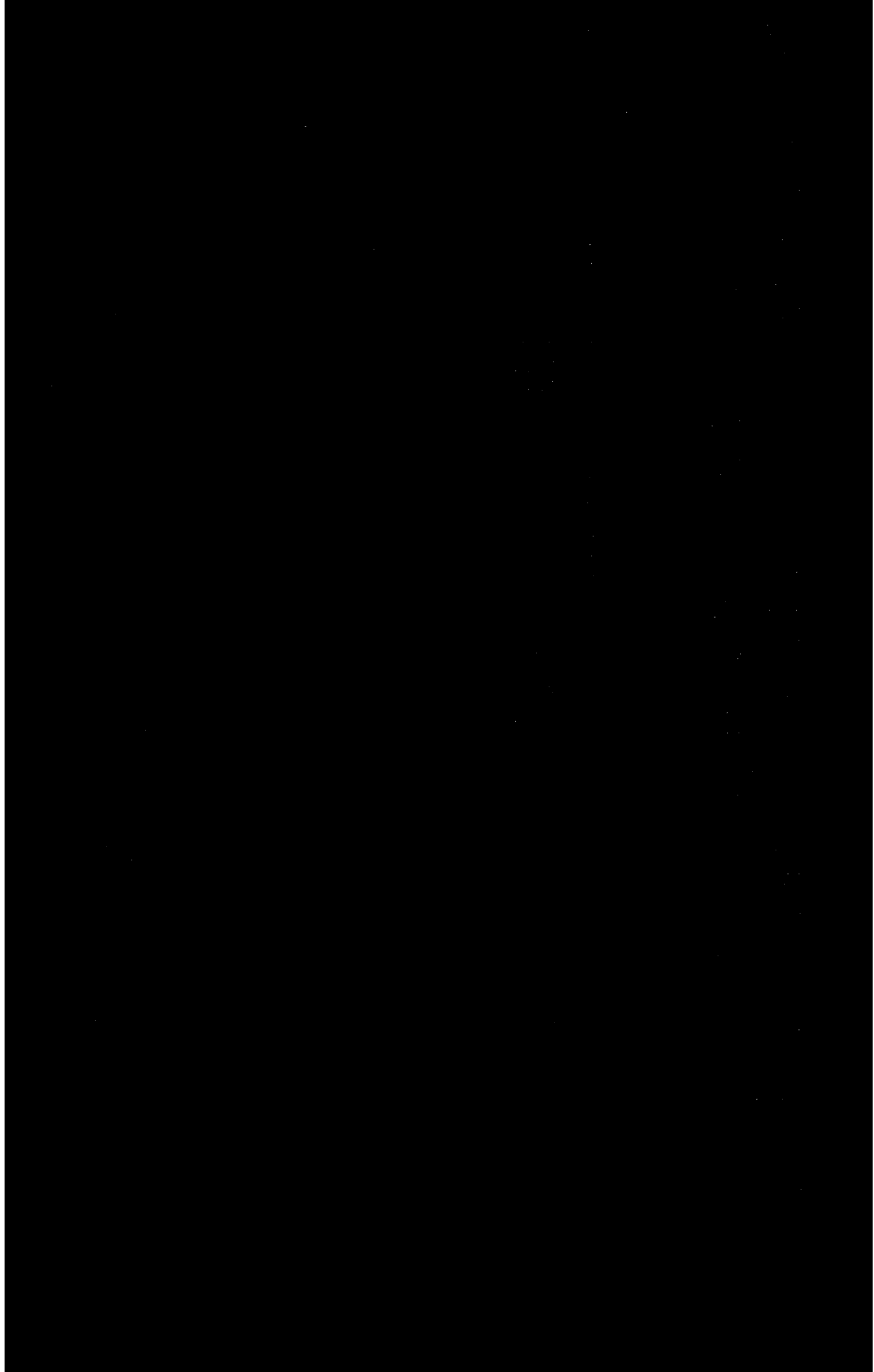

Example 3.—To a viscose solution obtained in the usual manner, for instance under the conditions given in Example 1, 1 part of diethylbenzamide is emulsified, so that the viscose contains 0.07 per cent of this addition. Threads which are spun from this viscose solution in a coagulating bath containing a mineral acid and inorganic